(12) United States Patent
Zimmet et al.

(10) Patent No.: US 7,870,212 B2
(45) Date of Patent: Jan. 11, 2011

(54) SYSTEM AND METHOD FOR EMBEDDING A RECORD OF ACTIVITY WITHIN ELECTRONIC MESSAGES

(75) Inventors: Carol Sue Zimmet, Boxborough, MA (US); Liam Harpur, Skerries (IE); Patrick Joseph O'Sullivan, Ballsbridge (IE)

(73) Assignee: International Business Machines Corporation, Armonk, NY (US)

( * ) Notice: Subject to any disclaimer, the term of this patent is extended or adjusted under 35 U.S.C. 154(b) by 177 days.

(21) Appl. No.: 12/347,555

(22) Filed: Dec. 31, 2008

(65) Prior Publication Data
US 2010/0169437 A1    Jul. 1, 2010

(51) Int. Cl.
*G06F 15/16* (2006.01)
(52) U.S. Cl. .............. 709/206; 709/219; 709/204; 709/203; 709/231; 705/38; 705/35; 705/39; 705/30; 705/10; 705/44; 715/751

(58) Field of Classification Search ........... 709/206, 709/219, 204, 203, 231
See application file for complete search history.

(56) References Cited

U.S. PATENT DOCUMENTS

| | | | |
|---|---|---|---|
| 6,564,220 B1 | 5/2003 | Huber et al. | |
| 7,237,008 B1 * | 6/2007 | Tarbotton et al. | 709/206 |
| 2007/0124432 A1 * | 5/2007 | Holtzman et al. | 709/219 |
| 2007/0282950 A1 | 12/2007 | Fischer et al. | |

FOREIGN PATENT DOCUMENTS

WO    2006016865 A1    2/2006

* cited by examiner

*Primary Examiner*—Jude J Jean Gilles
(74) *Attorney, Agent, or Firm*—Holland & Knight LLP; Brian J Colandreo, Esq.

(57) ABSTRACT

An indication of a creation of an electronic message is received. An activity report is generated in response to, at least in part, the indication, wherein at least a portion of the activity report is based, at least in part, upon a determined activity level of a computing system. The activity report is associated with the electronic message.

20 Claims, 6 Drawing Sheets

SYSTEM AND METHOD FOR EMBEDDING A RECORD OF ACTIVITY WITHIN ELECTRONIC MESSAGES

TECHNICAL FIELD

This disclosure relates to electronic mail systems and, more particularly, to a method of embedding a record of activity within electronic messages.

BACKGROUND

Conventional messaging systems generally allow users to exchange electronic mail messages across a network. Often, users may perform a multitude of activities in other applications while composing an electronic mail message. It may often be useful for a recipient of an email to be aware of the activities of the sender of an email around the time that the email was sent. In order for the recipient of the electronic mail message to know what those activities were, the sender may be required to describe the activities via telephone, written description, attaching screenshots, and the like.

SUMMARY OF DISCLOSURE

In a first implementation, a computer program product includes a computer readable medium having a plurality of instructions stored on it. When executed by a processor, the instructions cause the processor to perform operations including receiving an indication of a creation of an electronic message. An activity report is generated in response to, at least in part, the indication. At least a portion of the activity report is based, at least in part, upon a determined activity level of a computing system. The activity report is associated with the electronic message.

One or more of the following features may be included. The creation of the electronic message may include one or more of creating the electronic message as a new message, creating the electronic message as a reply message, and creating the electronic message as a forwarded message. Generating the activity report may include identifying one or more horizontal applications that may be executed by the computing system contemporaneously with the creation of the electronic message. Identifying the one or more horizontal applications may include monitoring at least a portion of data input to the one or more horizontal applications.

Associating the activity report in the electronic message may be based, at least in part, upon one or more permissions. The one or more permissions may be based, at least in part, upon one or more designated recipients of the electronic message. The one or more permissions may also be based, at least in part, upon one or more attributes of a sender of the electronic message.

According to another implementation, a computing system includes a processor and a memory module coupled with the processor. A first software module is executable by the processor and the memory module. The first software module is configured to receive an indication of a creation of an electronic message. A second software module is executable by the processor and the memory module. The second software module is configured to generate an activity report in response to, at least in part, the indication. At least a portion of the activity report is based, at least in part, upon a determined activity level of a computing system. A third software is module executable by the processor and the memory module. The third software module is configured to associate the activity report with the electronic message.

One or more of the following features may be included. The creation of the electronic message may include one or more of creating the electronic message as a new message, creating the electronic message as a reply message, and creating the electronic message as a forwarded message. Generating the activity report may include identifying one or more horizontal applications that may be executed by the computing system contemporaneously with the creation of the electronic message. Identifying the one or more horizontal applications may include monitoring at least a portion of data input to the one or more horizontal applications.

Associating the activity report in the electronic message may be based, at least in part, upon one or more permissions. The one or more permissions may be based, at least in part, upon one or more designated recipients of the electronic message. The one or more permissions may also be based, at least in part, upon one or more attributes of a sender of the electronic message.

According to yet another implementation, a computer implemented method includes receiving an indication of a creation of an electronic message. An activity report is generated in response to, at least in part, the indication, wherein at least a portion of the activity report is based, at least in part, upon a determined activity level of a first computing system. The activity report is associated with the electronic message. The activity report is transmitted to a second computing system.

One or more of the following features may be included. The creation of the electronic message may include one or more of creating the electronic message as a new message, creating the electronic message as a reply message, and creating the electronic message as a forwarded message. Generating the activity report may include identifying one or more horizontal applications that may be executed by the computing system contemporaneously with the creation of the electronic message. Identifying the one or more horizontal applications may include monitoring at least a portion of data input to the one or more horizontal applications.

Associating the activity report in the electronic message may be based, at least in part, upon one or more permissions. The one or more permissions may also be based, at least in part, upon one or more designated recipients of the electronic message.

The details of one or more implementations are set forth in the accompanying drawings and the description below. Other features and advantages will become apparent from the description, the drawings, and the claims.

DETAILED DESCRIPTION OF EXEMPLARY EMBODIMENTS

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
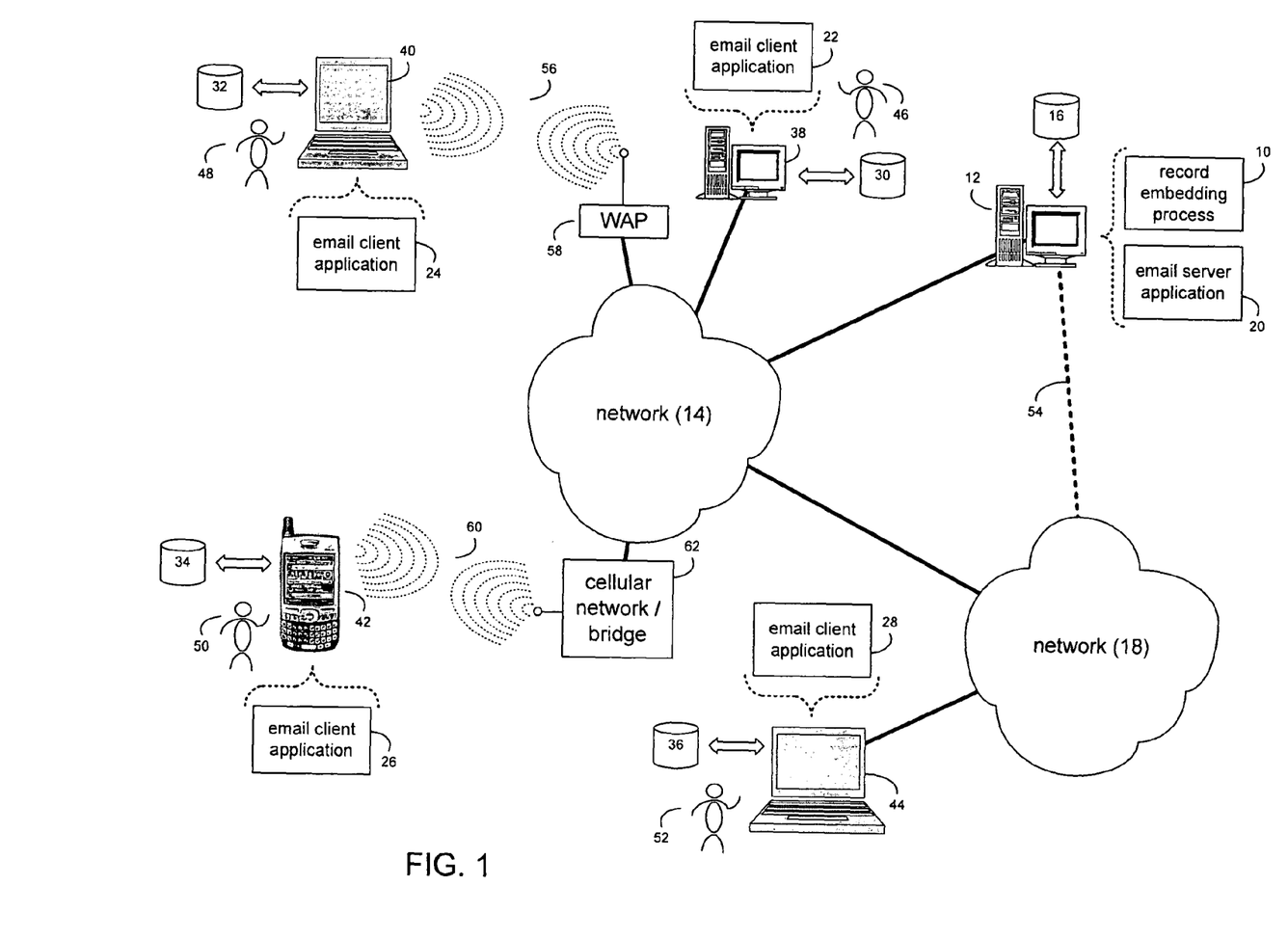
FIG. 1 diagrammatically depicts a record embedding process and an email server application coupled to a distributed computing system.

Referring to FIG. 1, there is shown record embedding process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® XP Server; Novell® Netware®; or Red Hat® Linux®, for example (Microsoft and Windows are registered trademarks of Microsoft Corporation in the United States, other countries, or both; Novell and NetWare are registered trademarks of Novell Corporation in the United States, other countries, or both; Red Hat is a registered trademark of Red Hat Corporation in the United States, other countries, or both; and Linux is a registered trademark of Linus Torvalds in the United States, other countries, or both). In addition, as an alternative, the record embedding process may reside on and may be executed by one or more client electronic devices, such as a personal computer, notebook computer, personal digital assistant, and data enabled cellular phone, for example.

As will be discussed below in greater detail, record embedding process 10 may receive an indication of a creation of an electronic message. An activity report may be generated in response to, at least in part, the indication, wherein at least a portion of the activity report may be based, at least in part, upon a determined activity level of a computing system. The activity report may be associated with the electronic message. While record embedding process 10 may be implemented in connection with any form of electronic message (e.g., electronic mail message, instant message, VoIP communication, and the like), for purpose explanation, record embedding process 10 will be described in the context of an electronic mail messaging system. However, this is for illustrative purposes only, and should not be construed as a limitation on the present disclosure.

The instruction sets and subroutines of record embedding process 10, which may include one or more software modules, and which may be stored on storage device 16 coupled to server computer 12, may be executed by one or more processors (not shown) and one or more memory architectures (not shown) incorporated into server computer 12. Storage device 16 may include but is not limited to: a hard disk drive; a solid state drive; a tape drive; an optical drive; a RAID array; a random access memory (RAM); and a read-only memory (ROM).

Server computer 12 may execute a web server application, examples of which may include but are not limited to: Microsoft IIS, Novell Webserver™, or Apache® Webserver, that allows for HTTP (i.e., HyperText Transfer Protocol) access to server computer 12 via network 14 (Webserver is a trademark of Novell Corporation in the United States, other countries, or both; and Apache is a registered trademark of Apache Software Foundation in the United States, other Countries, or both). Network 14 may be connected to one or more secondary networks (e.g., network 18), examples of which may include but are not limited to: a local area network; a wide area network; or an intranet, for example.

Server computer 12 may execute one or more email server applications (e.g., email server application 20), examples of which may include but are not limited to, e.g., Lotus® Domino® Server and Microsoft Exchange Server® (Lotus and Domino are registered trademark of International Business Machines Corporation in the United States, other countries, or both; and Exchange Server is a registered trademark of Microsoft Corporation in the United States, other countries, or both). Email server application 20 may interact with one or more email client applications (e.g., email client applications 22, 24, 26, 28) for routing and managing email communications. Examples of email client applications 22, 24, 26, 28 may include, but are not limited to, e.g., Lotus Notes® and Microsoft Outlook® (Lotus Notes is a registered trademark of International Business Machines Corporation in the United States, other countries, or both; and Outlook is a registered trademark of Microsoft Corporation in the United States, other countries, or both).

Record embedding process 10 may be a stand-alone application that interfaces with email server application 20 or may be an applet/application that is executed within email server application 20.

The instruction sets and subroutines of email server application 20, which may be configured as one or more software modules, which may be stored on storage device 16 coupled to server computer 12, may be executed by one or more processors (not shown) and one or more memory architectures (not shown) incorporated into server computer 12.

As mentioned above, in addition/as an alternative to being a server-based application residing on server computer 12, the record embedding process may be a client-side application (not shown) residing on a storage device (e.g., stored on storage devices 30, 32, 34, 36, respectively) of one or more client electronic devices 38, 40, 42, 44. As such, the record embedding process may be a stand-alone application that interfaces with an email client application (e.g., email client applications 22, 24, 26, 28), or may be an applet/application that is executed within an email client application. As such, the record embedding process may be a client-side process, a server-side process, or a hybrid client-side/server-side process, which may be executed, in whole or in part, by server computer 12, or one or more of client electronic devices 38, 40, 42, 44.

The instruction sets and subroutines of email client applications 22, 24, 26, 28, which may be configured as one or more software modules, and which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and memory stick storage devices. Examples of client electronic devices 38, 40, 42, 44 may include, but are not limited to, personal computer 38, laptop computer 40, personal digital assistant 42, notebook computer 44, a data-enabled, cellular telephone (not shown), and a dedicated network device (not shown), for example. Using email client applications 22, 24, 26, 28, users 46, 48, 50, 52 may send, receive, manage, etc., email communications. Sending, receiving, and managing email communications may include accessing and/or interacting with email server application 20.

Users 46, 48, 50, 52 may access email server application 20 directly through the device on which the email client application (e.g., email client applications 22, 24, 26, 28) is executed, namely client electronic devices 38, 40, 42, 44, for example. Users 46, 48, 50, 52 may access email server application 20 directly through network 14 or through secondary network 18. Further, server computer 12 (i.e., the computer that executes email server application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows, Microsoft Windows CE®, Red Hat Linux, or a custom operating system (Windows CE is a registered trademark of Microsoft Corporation in the United States, other countries, or both).

For the purpose of the following description, the record embedding process will be discussed in the context of an electronic mail messaging system, however this should not be construed as a limitation of the present disclosure, as other electronic messaging systems (e.g., instant messaging, VoIP communications, and the like) may be equally utilized. Additionally, for the purpose of the following description, email client application 22 may be discussed. However, this is for illustrative purposes only and should not be construed as a limitation of the present disclosure, as other email client applications (e.g., email client applications 24, 26, 28) may be equally utilized.

Figure 2:
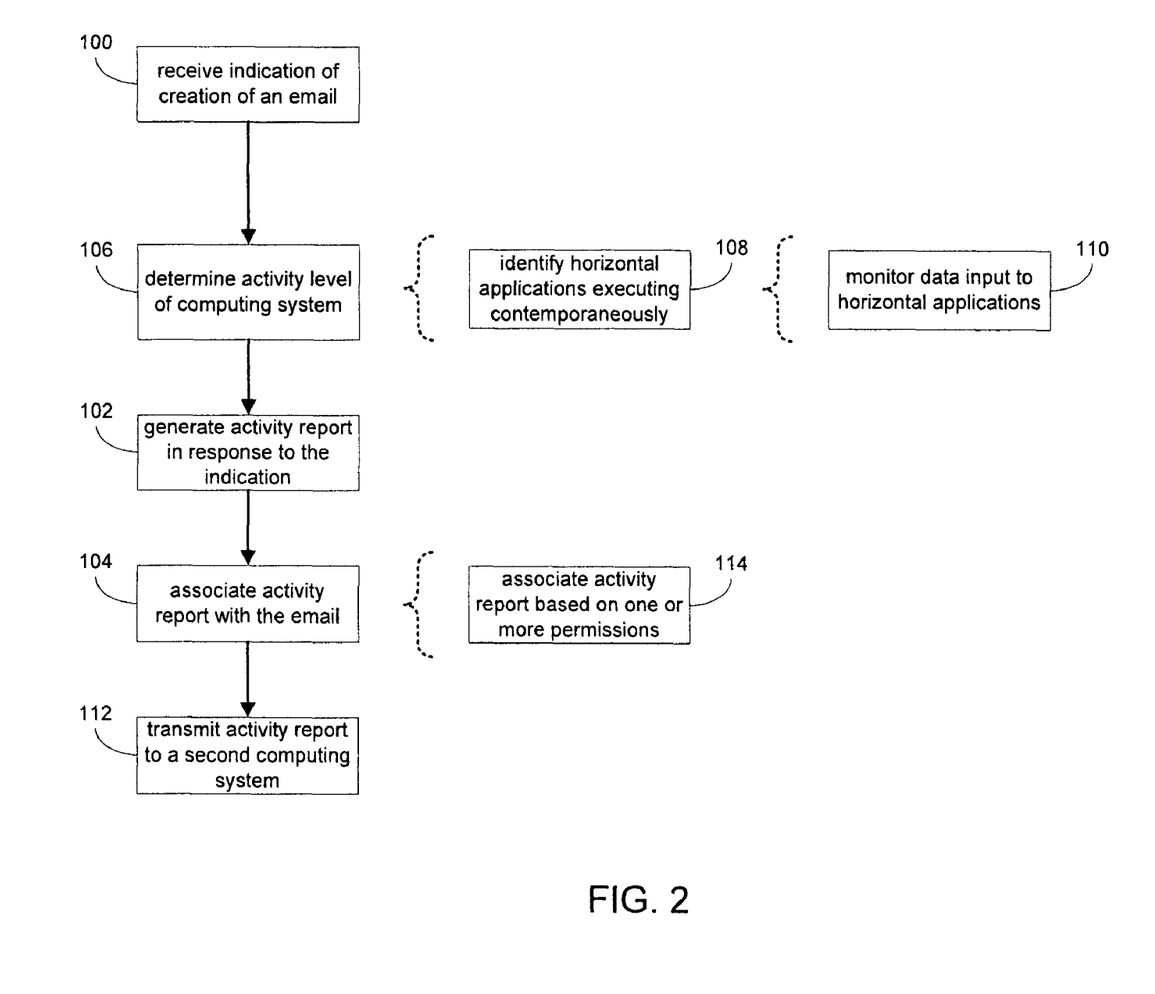
FIG. 2 is a flow chart of a process performed by the record embedding process of FIG. 1.

Referring also to FIG. 2, record embedding process 10 generally may receive 100 an indication of a creation of an electronic mail message. Record embedding process 10 may further generate 102 an activity report in response to, at least in part, the indication, wherein at least a portion of the activity report is based, at least in part, upon a determined activity level of a computing system. The activity report may be associated 104 with the electronic mail message.

Figure 3:
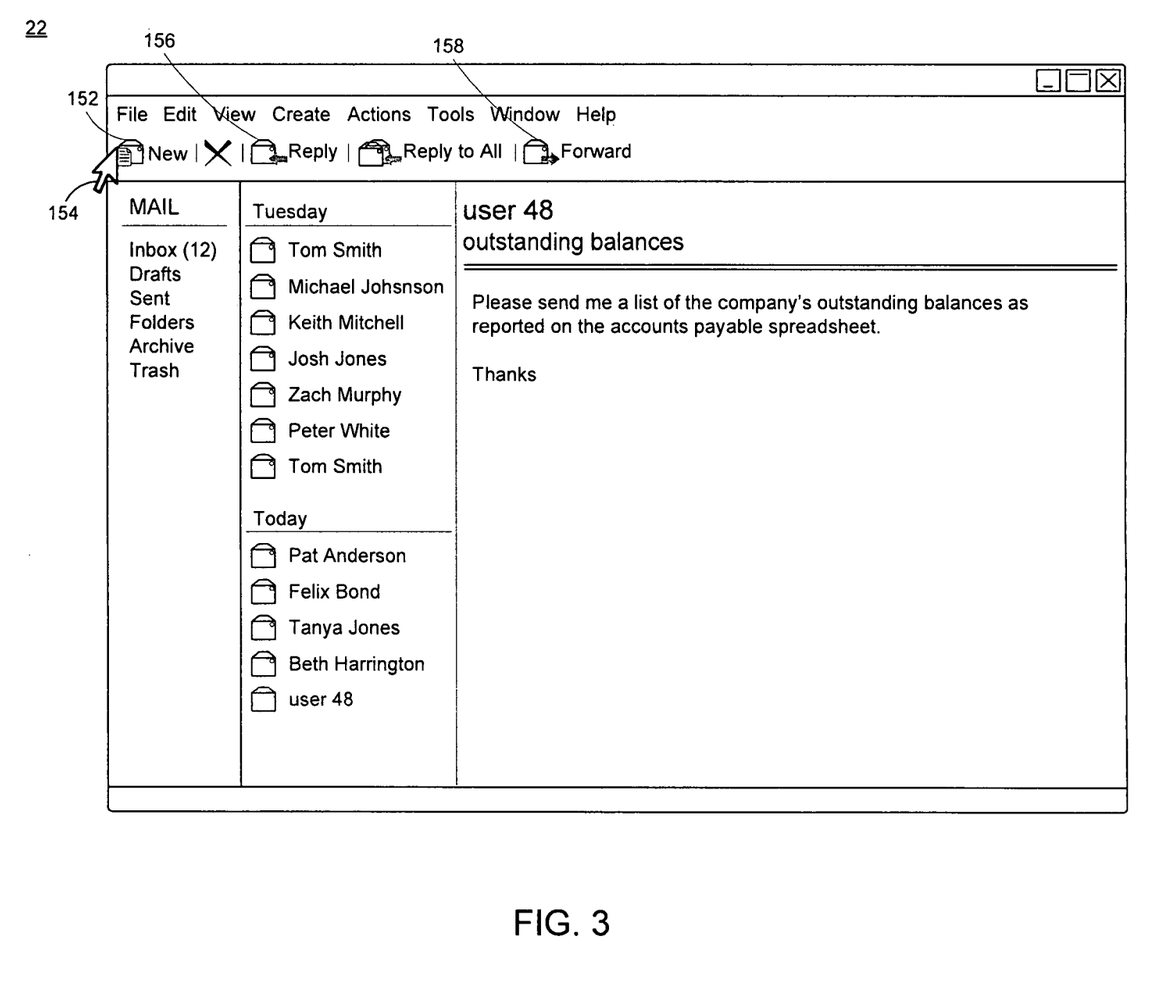
FIG. 3 diagrammatically depicts an electronic mail user interface that may be rendered by the record embedding process and/or the email server application of FIG. 1.
Figure 4:
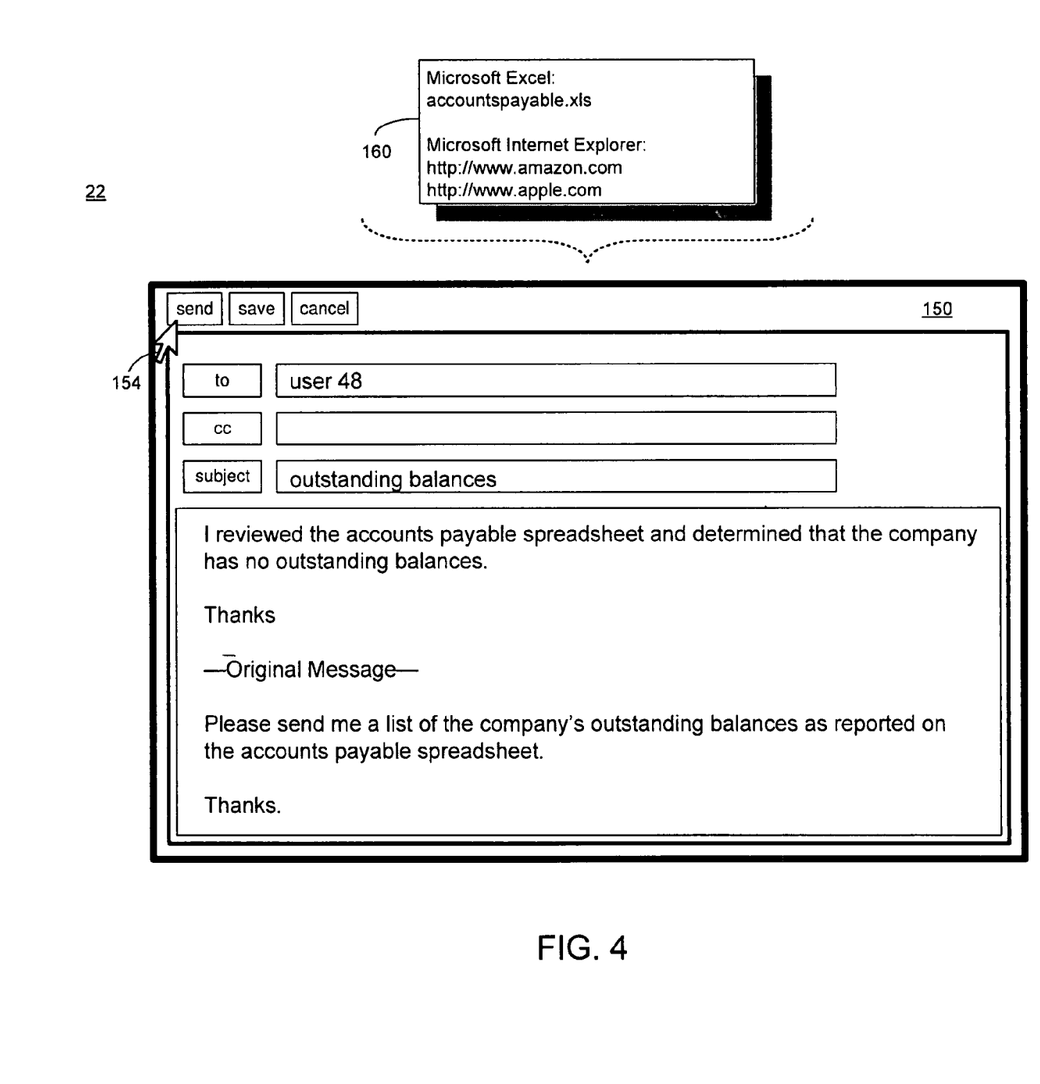
FIG. 4 diagrammatically depicts an electronic mail user interface that may be rendered by the record embedding process and/or the email server application of FIG. 1.

For example, and referring also to FIGS. 3 & 4, utilizing email client application 22, user 46 may create a new electronic mail message by selecting, e.g., New button 152. User 46 may select, e.g., New button 152 by positioning onscreen pointer 154 (e.g., which may be controlled by a pointing device, such as a mouse; not shown) over "New" in email client application 22 and left-clicking. Upon user 46 creating the electronic mail message, record embedding process 10 may receive 100 an indication of the creation of electronic mail message.

While the creation of the electronic mail message is described in relation to the creation of a new mail message (e.g., via selection of New button 152), this should not be construed as a limitation of the present disclosure as an electronic mail message may be created in a number of fashions. For example, user 46 may create an electronic mail message as a reply message by selecting Reply button 156. Additionally/alternatively, user 46 may create an electronic mail message as a forwarded message by selecting Forward button 158. Upon creation of the electronic mail message, record embedding process 10 may receive 100 an indication of the creation from, e.g., email client application 22. For example, and referring also to FIG. 4, user 46 may create electronic mail message 150 (e.g., which may be a reply electronic mail message (e.g., which may be addressed to user 48 as the intended recipient).

Record embedding process 10 may determine 106 an activity level of a computing system (e.g., client electronic devices 38, utilized by user 46). Determining 106 an activity level may include, but is not limited to: identifying 108 one or more horizontal applications executed by the computing system contemporaneously with the creation of electronic mail message 150, and monitoring 110 at least a portion of data input to the one or more horizontal applications. For the purposes of the present disclosure, a horizontal application may include any computer-executed application other than email client application 22. Thus, for example, record embedding process 10 may identify 108 one or more horizontal applications (e.g., Microsoft Excel, Microsoft Internet Explorer) that are executing contemporaneously with the creation of electronic mail message 150 by, e.g., user 46.

Continuing with the above-stated example, the identifying 108 contemporaneously executing horizontal applications may also include monitoring 110 at least a portion of data input to the one or more horizontal applications. That is, assuming user 46 was utilizing Microsoft Excel and Microsoft Internet Explorer at the same time that user 46 created electronic mail message 150, record embedding process 10 may begin monitoring 110 the data user 46 inputs to those horizontal applications. As will be described in greater detail below, monitored 110 data input may vary depending on the level of desired detail, though it may include, e.g., file names, spreadsheet data for Microsoft Excel and uniform resource locator "URL" data for Microsoft Internet Explorer.

Additionally, while the identification 108 (and/or monitoring 110) of the execution of one or more horizontal applications has been described herein as "contemporaneous," this is not a limitation of this disclosure. One of skill in the art will appreciate that, e.g., a buffer (not shown) may be utilized to enable the identification 108 and/or monitoring 110 of the one or more horizontal applications prior to the creation of electronic mail message 150. For example, record embedding process 10 (alone or in conjunction with one or more of email client application 22 and/or email server application 20) may implement a buffer such that, when user 46 creates 102 electronic mail message 150, any horizontal applications that were executing, e.g., within five (5) minutes prior to the creation of electronic mail message 150 may be identified 108 and/or monitored 110.

Moreover, the identification 108 and/or monitoring 110 may occur after the creation of electronic mail message 150 (e.g., after electronic mail message 150 was transmitted to a second computing system). For example, for five (5) minutes after user 46 transmits electronic mail message 150 to user 48, record embedding process 10 may identify 108 and/or monitor 110 the activity level of the computing system (e.g., client electronic device 38) that user 46 may be utilizing. As will be described in greater detail below, this subsequent information may then be transmitted to the second computing system.

Record embedding process 10 may also generate 102 an activity report in response to, at least in part, the indication of the received 100 indication of the creation of an electronic mail message (e.g., electronic mail message 150). As mentioned above, record embedding process 10 may determine 106 an activity level of the computing system (e.g., client electronic device 38), which may include information concerning the one or more identified 108 horizontal applications and/or the monitored 110 data input to the one or more horizontal applications. Accordingly, record embedding process 10 may generate 102 the activity report based, at least in part, upon the one or more identified 108 horizontal applications and/or the monitored 112 data input to the one or more horizontal applications.

Continuing with the above-stated example, it may be assumed that user 46 received an electronic mail message from user 48 requesting information stored in a spreadsheet. Upon receipt of the electronic mail message from user 48, user 46 may create electronic mail message 150 as a reply message, e.g., by selecting Reply button 156. Record embedding process may receive 100 an indication of the creation of electronic mail message 150. Contemporaneously (e.g., in a relatively short time period before or after creating electronic mail message 150), user 46 may open the relevant spreadsheet by executing Microsoft Excel, which may then be identified 108 by record embedding process 10. Upon finding the information requested by user 48 (e.g., in the email received by user 46) in the relevant spreadsheet, user 46 may compose an appropriate response (e.g., in the form of electronic mail message 150) to user 48. Further, also contemporaneously to creating electronic mail message 150, user 46 may view a web page (e.g., using a web browser, such as Microsoft Internet Explorer). Accordingly, the determined 106 activity level of the computing system (e.g., client electronic device 38) of user 46 may include identifying 108 Microsoft Excel and Microsoft Internet Explorer as horizontal applications. Based upon, at least in part, the determined 106 activity level, record embedding process may generate 102 an activity report.

Additionally, record embedding process 10 may associate 104 the activity report (e.g., activity report 160) with the created electronic mail message (e.g., electronic mail message 150). Associating 104 activity report 160 with electronic mail message 150 may include, but is not limited to: embedding activity report 160 as an attachment to electronic mail message 150, embedding activity report 160 within the body of electronic mail message 150, and/or transmitting activity report 160 as a separate electronic mail message addressed to the intended recipient of electronic mail message 150. Continuing with the above-stated example, generated 102 activity report 160 of user 46 may be associated 104 (e.g., embedded as an attachment) with electronic mail message 150.

Figure 5:
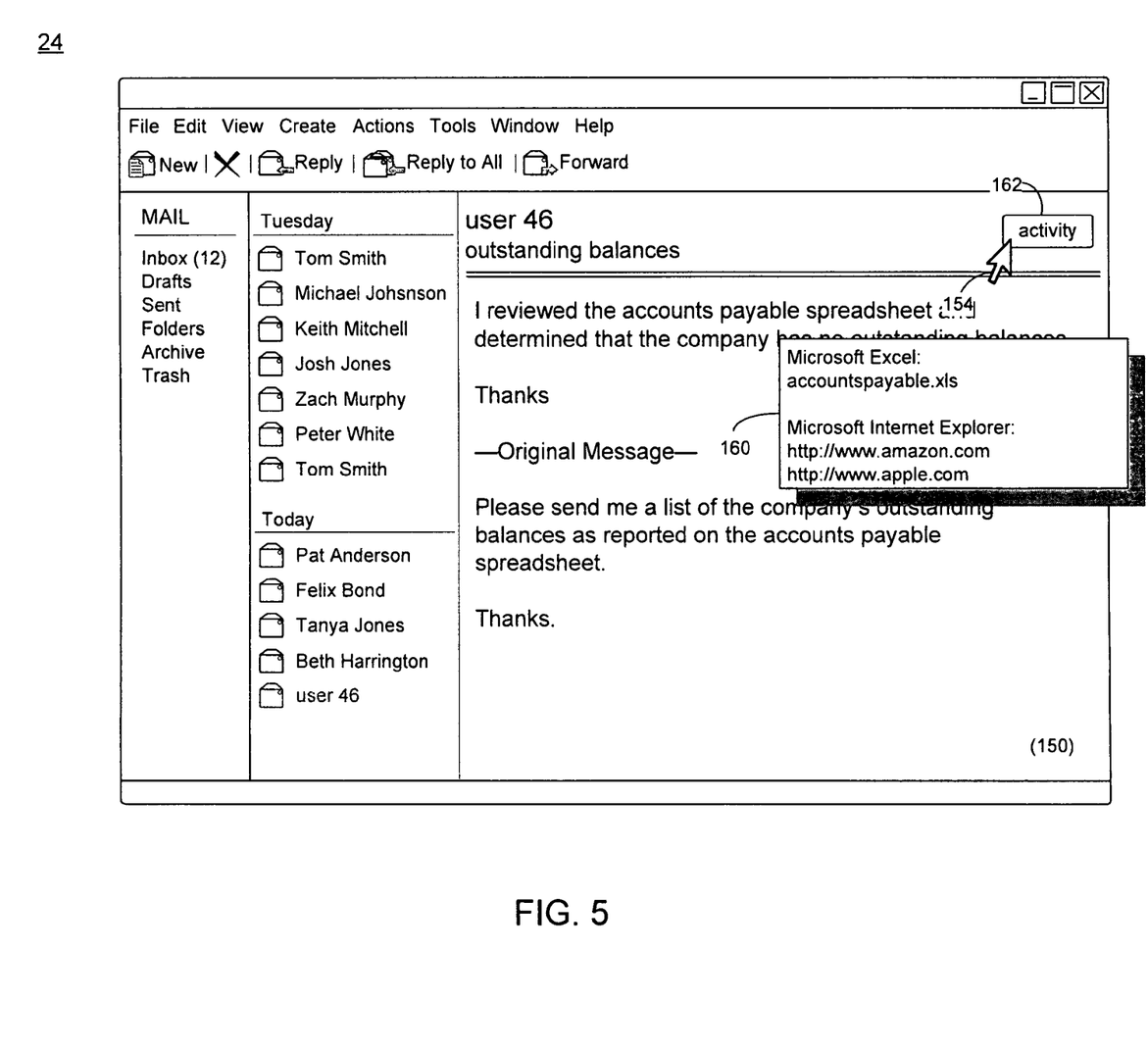
FIG. 5 diagrammatically depicts an electronic mail user interface that may be rendered by the record embedding process and/or the email server application of FIG. 1.

After composing, in electronic mail message 150, a desired response, user 46 may send electronic mail message 150 to user 48, e.g., by selecting, via onscreen pointer 154, the "send" button Referring also to FIG. 5, upon selecting "send" button, electronic mail message 150 may be transmitted to user 48. Further, record embedding process 10 may transmit 112 activity report 160 to a second computing system (e.g., to client electronic device 40).

Upon receipt of electronic mail message 150 (e.g., via email client application 24) by user 48, user 48 may be able to view activity report 160 associated 104 with electronic mail message 150. For example, user 48 may select, via onscreen pointer 154, activity button 162, resulting in record embedding process (alone or in conjunction with one or more of email client application 24 and/or email server application 20) rendering activity report 160. Activity report 160 may, for example, indicate that contemporaneously with creating electronic mail message 150, user 46 may have accessed the file "accountspayable.xls" using Microsoft Excel, and may have accessed the web page associated with the URL's "http://www.amazon.com" and "http://www.apple.com" using Microsoft Internet Explorer. Activity report 160 may, for example, allow user 48 to verify that user 46 provided an appropriate response (i.e., by reviewing the relevant spreadsheet).

Additionally, the activity report (e.g., activity report 160) may include a time-wise indicator of the activities (not shown). For example, the activity report may indicate what activities were performed at what point during the composition of the electronic mail message. The time-wise indicator of activities may relate the activities to the absolute time of composition of the electronic mail message. For example, if the electronic mail message was composed over a ten minute period of time (e.g., the time from first opening the electronic mail message creation interface until the electron mail message was sent), the activity report may indicate the time at which each activity occurred (e.g., a web browser was open when the electronic mail message creation interface was invoked, at two minutes in the composition of the electronic mail message a database was accessed, etc.). Similarly, the activity report may indicate the duration of each activity (e.g., reviewing web browser content for ten minutes, reviewing the spreadsheet for fifteen minutes, etc.). Additionally/alternatively, the time-wise indicator may relate the activities to various portions of the electronic mail message. For example, for a multi-paragraph electronic mail message, the activity report may indicate what activities were occurring which each of the multiple paragraphs were being composed. Various additional/alternative configurations of the activity report may similarly be implemented.

In addition to accessing activity report 160 upon selecting, via onscreen pointer 154, activity button 162, the activity report may be a searchable field within an electronic mailbox (such as an Inbox). As such, a user may search an electronic mailbox for items included within one or more activity reports associated with one or more respective electronic mail messages. For example, a user may search an electronic mailbox for activity reports indicating that the sender of the electronic mail message was, e.g., using a web browser, accessing a specific word processing document, or the like, at the time that the electronic mail message was created. Various searching parameters (e.g., by general activity, specific content access, etc.) may be utilized.

In a related manner, one or more filtering parameters may be applied to an activity report (e.g., by the sender of the electronic mail message and/or by the recipient of the electronic mail message having the associated activity report). The filtering parameter may be included, e.g., during generation of the activity report (e.g., such that the filtering parameter may exclude certain activities from being included within the activity report), and/or when the activity report is viewed by a recipient of an electronic mail message having an associated activity report (e.g., such that the filtering parameter may exclude certain activities from being displayed in the activity report viewed by the recipient). The filtering parameter may be manually applied (e.g., based upon, at least in part, a user inputted filtering parameter), and/or may be automatically applied (e.g., by a content review module that may).

Further, associating 104 the activity report with the electronic mail message may include associating 114 the activity report based, at least in part, upon one or more permissions. The one or more permissions may be based, at least in part, upon an organizational structure, e.g., of a corporation, organization, agency, or the like. The organizational structure may be embodied, for example, in a corporate directory, such as an LDAP directory. For example, greater permissions may be assigned to a manager (e.g., user 48) than an hourly employee (e.g., user 46), which may result in differences in the activity reports (e.g., activity report 160) associated 104 with the electronic mail message.

Additionally, the one or more permissions may be based, at least in part, upon one or more designated recipients (e.g., user 48) of the electronic mail message (e.g., electronic mail message 150). Applying the above-stated example, user 46 may create electronic mail message 150 as a reply message that responds to the request for information from user 48 (i.e., a designated recipient). As a result of the greater permissions assigned to user 48, user 48 may be able to review all of the information concerning the determined 106 activity level of the computing system (e.g., client electronic device 38) of user 46. For example, user 48 may have access to the identified 108 horizontal applications (e.g., Microsoft Excel and Microsoft Internet Explorer), as well as the monitored 110 data input to the horizontal applications (e.g., input spreadsheet data for Microsoft Excel, and URLs input to Microsoft Internet Explorer) for user 46.

Figure 6:
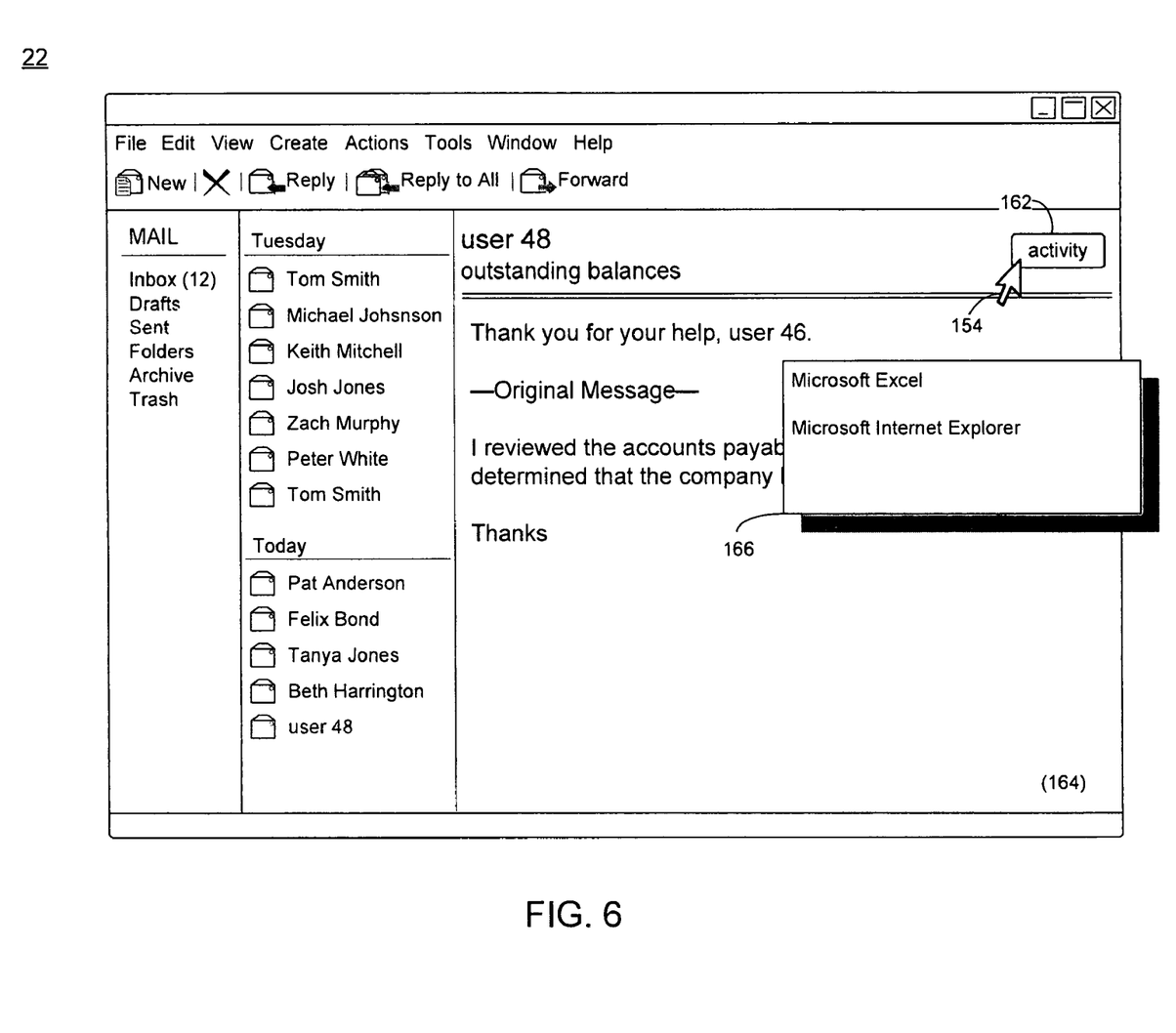
FIG. 6 diagrammatically depicts an electronic mail user interface that may be rendered by the record embedding process and/or the email server application of FIG. 1.

Additionally/alternatively, and referring also to FIG. 6, assume that user 48 created electronic mail message 164 as a subsequent reply message to electronic mail message 150 of user 46, e.g., which may be received by user 46 via email client application 22. Electronic mail message 164 may include an associated 104 activity report (e.g., activity report 166) for user 48 (e.g., which may be generated and associated with electronic mail message 164 in a manner similar to the above described activity report 160 associated with electronic mail message 150). Due to the reduced permissions assigned to user 46 (e.g., based upon user 46 being an hourly employee), associated 104 activity report 166 for user 48 may not be reviewable by user 46. However, this is not intended to be a limitation of the present disclosure, as varying levels of review may be permitted based upon the one or more permissions. For example, as shown in FIG. 6, user 46 may have access to the horizontal applications (namely, "Microsoft Excel" and "Microsoft Internet Explorer") identified 108 within activity report 166 associated 104 with the electronic mail message 164 of user 48 (but not the monitored 110 data input to the horizontal applications, e.g., which may include the URL's of web pages accessed by user 48 and/or file names of files accessed by user 48 via Microsoft Excel).

Additionally/alternatively, the one or more permissions may be based, at least in part, upon one or more attributes of a sender of an electronic mail message. One or more attributes of a sender of an electronic mail message may include, but are not limited to: an administrator of email server application 20, or other user having super-user permissions (e.g., a corporate CEO or the like). For example, user 50 may be the CEO of an organization. As such, generated 102 activity reports may not be associated 104 with electronic mail messages created by user 50 (and/or associated 104 activity reports may not be accessible to other users), based upon, at least in part, permissions that may have been based on the sender's CEO attribute.

Record embedding process 10 may also enable a user (e.g., user 48) to require a designated recipient (e.g., user 46) to perform a specified activity prior to responding to an electronic mail message. For example, user 48 may utilize record embedding system 10 (alone or in conjunction with one or more of email server application 20, email client application 24, and/or email client application 22) to create an electronic mail message that requires user 46 to review an article embodied in a website prior to responding to the electronic mail message. In this situation, prior to allowing user 46 to create (and/or transmit, as will be described in greater detail below) an electronic mail message in response to the electronic mail message of user 48, record embedding process 10 may verify that, e.g., Microsoft Internet Explorer was identified 108 as a contemporaneously executing horizontal application, and may monitor 110 the same to verify that the appropriate URL was input by user 46.

In the event that, e.g., user 46 has created multiple incomplete electronic mail messages, record embedding process 10 may be configured to forego associating 104 activity reports with the electronic mail messages. Additionally, record embedding process 10 may also be configured to forego associating 104 activity reports with electronic mail messages if a significant amount of time elapsed (e.g., 3 hours) between receiving 100 an indication of the creation of an electronic mail message and transmission 112 of the electronic mail message.

Consistent with the present disclosure, the record embedding process may, at least in part, associate an activity report with an electronic mail message. As described above, the activity report may be, for example, embedded as a hidden field, an attachment, or the like. Accordingly, event in the event that the electronic mail message having an associated activity report is received on an email client application that is not capable of viewing the activity report, the activity report may persist (e.g., the hidden field, attachment, or the like) with the electronic mail message, and electronic mail message exchanges may remain fully operational. Further, as the activity report may persist with the electronic mail message, if the electronic mail message is subsequently accessed by an email client application capable of viewing the activity report, the activity report may be accessed.

For the convenience of description, the above examples have pertained to the association of activity reports, in which the electronic mail message included only a single recipient. As such, only a single set of permission information was described. It should be understood that for an email including multiple recipients (e.g., multiple "to" recipients, "cc" recipients, and/or "bcc" recipients) that activity reports may be associated based on one or more permissions for one, some, and/or all of the multiple recipients. Various additional/alternative features and embodiments will be understood.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A computer program product residing on a computer readable medium having a plurality of instructions stored thereon which, when executed by a processor, cause the processor to perform operations comprising:
   receiving an indication of a creation of an electronic message;
   generating an activity report in response to, at least in part, the indication, wherein at least a portion of the activity report is based, at least in part, upon a determined activity level of a computing system; and
   associating the activity report with the electronic message.

2. The computer program product of claim 1, wherein the creation of the electronic message includes one or more of:
creating the electronic message as a new message;
creating the electronic message as a reply message; and
creating the electronic message as a forwarded message.

3. The computer program product of claim 1, wherein generating the activity report further comprises:
identifying one or more horizontal applications executed by the computing system contemporaneously with the creation of the electronic message.

4. The computer program product of claim 3, wherein identifying the one or more horizontal applications includes:
monitoring at least a portion of data input to the one or more horizontal applications.

5. The computer program product of claim 1, wherein associating the activity report in the electronic message is based, at least in part, upon one or more permissions.

6. The computer program product of claim 5, wherein the one or more permissions are based, at least in part, upon one or more designated recipients of the electronic message.

7. The computer program product of claim 5, wherein the one or more permissions are based, at least in part, upon one or more attributes of a sender of the electronic message.

8. A computing system comprising:
a processor;
a memory module coupled with the processor;
a first software module executable by the processor and the memory module, wherein the first software module is configured to receive an indication of a creation of an electronic message;
a second software module executable by the processor and the memory module, wherein the second software module is configured to generate an activity report in response to, at least in part, the indication, wherein at least a portion of the activity report is based, at least in part, upon a determined activity level of a computing system; and
a third software module executable by the processor and the memory module, wherein the third software module is configured to associate the activity report with the electronic message.

9. The computing system of claim 8, wherein the creation of the electronic message includes one or more of:
creating the electronic message as a new message;
creating the electronic message as a reply message; and
creating the electronic message as a forwarded message.

10. The computing system of claim 8, wherein generating the activity report further comprises:
identifying one or more horizontal applications executed by the computing system contemporaneously with the creation of the electronic message.

11. The computing system of claim 10, wherein identifying the one or more horizontal applications includes:
monitoring at least a portion of data input to the one or more horizontal applications.

12. The computing system of claim 8, wherein associating the activity report in the electronic message is based, at least in part, upon one or more permissions.

13. The computing system of claim 12, wherein the one or more permissions are based, at least in part, upon one or more designated recipients of the electronic message.

14. The computing system of claim 12, wherein the one or more permissions are based, at least in part, upon one or more attributes of a sender of the electronic message.

15. A computer implemented method comprising:
receiving an indication of a creation of an electronic message;
generating an activity report in response to, at least in part, the indication, wherein at least a portion of the activity report is based, at least in part, upon a determined activity level of a first computing system;
associating the activity report with the electronic message; and
transmitting the activity report to a second computing system.

16. The computer implemented method of claim 15, wherein the creation of the electronic message includes one or more of:
creating the electronic message as a new message;
creating the electronic message as a reply message; and
creating the electronic message as a forwarded message.

17. The computer implemented method of claim 15, wherein generating the activity report further comprises:
identifying one or more horizontal applications executed by the computing system contemporaneously with the creation of the electronic message.

18. The computer implemented method of claim 17, wherein identifying the one or more horizontal applications includes:
monitoring at least a portion of data input to the one or more horizontal applications.

19. The computer implemented method of claim 15, wherein associating the activity report in the electronic message is based, at least in part, upon one or more permissions.

20. The computer implemented method of claim 19, wherein the one or more permissions are based, at least in part, upon one or more designated recipients of the electronic message.

* * * * *